(12) United States Patent
Park et al.

(10) Patent No.: US 11,769,880 B2
(45) Date of Patent: Sep. 26, 2023

(54) METHOD OF MIXING CATHODE ACTIVE MATERIAL

(71) Applicants: HYUNDAI MOTOR COMPANY, Seoul (KR); KIA CORPORATION, Seoul (KR)

(72) Inventors: Sang Mok Park, Gwangju-si (KR); Seung Min Oh, Incheon (KR); Woo Young Jin, Busan (KR); Ji Eun Lee, Hwaseong-si (KR); Sang Hun Lee, Paju-si (KR); Ko Eun Kim, Cheongju-si (KR); Jun Ki Rhee, Suwon-si (KR); Yoon Sung Lee, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 118 days.

(21) Appl. No.: 17/460,036

(22) Filed: Aug. 27, 2021

(65) Prior Publication Data
US 2022/0149374 A1  May 12, 2022

(30) Foreign Application Priority Data

Nov. 12, 2020 (KR) .......................... 10-2020-0151290

(51) Int. Cl.
*H01M 4/60* (2006.01)
*H01M 4/36* (2006.01)
(Continued)

(52) U.S. Cl.
CPC ........... *H01M 4/60* (2013.01); *H01M 4/0471* (2013.01); *H01M 4/364* (2013.01); *H01M 4/621* (2013.01); *H01M 4/624* (2013.01)

(58) Field of Classification Search
CPC ....... H01M 10/0525; H01M 2004/028; H01M 4/0404; H01M 4/0471; H01M 4/364;
(Continued)

(56) References Cited

U.S. PATENT DOCUMENTS 7,875,388 B2   1/2011 Le
2019/0190009 A1*  6/2019 Noh ...................... H01M 4/505

FOREIGN PATENT DOCUMENTS

KR        20140081663        7/2014
KR        1017618030000      7/2017

OTHER PUBLICATIONS

Hays, K.A., Ruther, R.E., Kukay A.J., Cao, P., Tomonori, S. Wood, III, D.L., Li, Jianlin. What makes lithium substituted polyacrylic acid a better binder than polyacrylic acid for silicon-graphite composite anodes? J. Power Sources 384 (2018) 136-144.
(Continued)

*Primary Examiner* — Victoria H Lynch
(74) *Attorney, Agent, or Firm* — MCDONNELL BOEHNEN HULBERT & BERGHOFF LLP

(57) ABSTRACT

A method of mixing a cathode active material in a process of manufacturing a cathode of a lithium secondary battery is provided. The method includes a preparation step of preparing a lithium compound removal solution in which PAA (polyacrylic acid) is mixed with a solvent, a removal step of reacting the lithium compound removal solution with the cathode active material, on a surface of which a lithium compound is present, thus removing the lithium compound present on the surface of the cathode active material, and a mixing step of mixing the cathode active material, which is mixed with the lithium compound removal solution, with a conductive material and a binder.

7 Claims, 4 Drawing Sheets

(51) Int. Cl.
*H01M 4/62* (2006.01)
*H01M 4/04* (2006.01)

(58) Field of Classification Search
CPC ........ H01M 4/60; H01M 4/621; H01M 4/622; H01M 4/624; Y02E 60/10
See application file for complete search history.

(56) References Cited

OTHER PUBLICATIONS

Schmidt, Adam. Development of Advanced Multifunctional Polymer Binders for Cathode Materals in Lithium-Ion Batteries. Honors Thesis, Dept. of Mechanical and Aerospace Engineering. Mar. 29, 2018.

Pieczonka, N.P.W., Borgel, V., Ziv, B., Leifer, N., Dargel, V., Aurbach, D., Kim, J-H., Liu, Z., Huang, X., Krachovsky, S. A., Goward, G.R., Halalay, I., Powell, B.R., Manthiram, A. Lithium Polyacrylate (LiPAA) as an Advanced Binder and a Passivating Agent for High-Voltage Li-Ion Batteries. Advanced Energy Materials, vol. 5, Issue 23, Dec. 9, 2015.

* cited by examiner

METHOD OF MIXING CATHODE ACTIVE MATERIAL

CROSS REFERENCE TO RELATED APPLICATION

The present application claims priority to Korean Patent Application No. 10-2020-0151290, filed Nov. 12, 2020, the entire content of which is incorporated herein for all purposes by this reference.

BACKGROUND

1. Field

The present disclosure relates to a process of mixing a cathode active material during an electrode manufacturing process to manufacture a lithium secondary battery.

2. Description of the Related Art

A process of manufacturing a lithium secondary battery may be broadly divided into three stages: an electrode process, an assembly process, and a formation process. The electrode process is a process of manufacturing an electrode.

The assembly process is a process of attaching a tab to the manufactured electrode, inserting a separation membrane to manufacture a jelly roll, and injecting an electrolytic solution. The formation process is a process of activating a battery, inspecting defects of the manufactured secondary battery, and performing sorting. The process of activating the battery includes charging/discharging and aging the assembled battery, thus stabilizing the battery structure and making the battery usable.

The present disclosure relates to a method of mixing a cathode active material performed in the electrode process among the above-described processes.

In accordance with the demand for higher energy formation and lower cost of battery cells, it is necessary to increase the nickel (Ni) ratio among the components of the cathode active material. In general, when the Ni ratio of the cathode active material is increased, the amount of lithium (Li) remaining on the surface of the active material is increased depending on the synthesis conditions and the mixing of raw materials. When the amount of the remaining lithium is above a predetermined level, there are problems in that it is difficult to perform the process due to the change in physical properties of a slurry during an electrode mixing process, and that after the battery is manufactured, the performance of the battery is not properly ensured, for example, the amount of gas generated is increased.

In order to solve these problems, methods such as the addition of water washing and heat treatment processes during the manufacture of active materials or the control of moisture during the mixing process are used. However, these methods lead to an increase in the production cost of active materials and an increase in the cost of the electrode manufacturing process.

Details set forth in the background are provided for the purpose of better understanding the background of the disclosure, and are not to be taken as an admission that the described details correspond to the conventional technology already known to those skilled in the art.

SUMMARY

Accordingly, the present disclosure has been made keeping in mind the above problems occurring in the field, and an objective of the present disclosure is to provide a method of mixing a cathode active material, which stably maintains the physical properties of a cathode electrode slurry and maximally ensures the electrochemical properties of cells, without performing an additional process during manufacturing of the cathode active material or a process of controlling moisture during mixing.

In order to accomplish the above objective, a method of mixing a cathode active material in a process of manufacturing a cathode of a lithium secondary battery according to the present disclosure includes a preparation step of preparing a lithium compound removal solution in which PAA (polyacrylic acid) is mixed with a solvent, a removal step of reacting the lithium compound removal solution with the cathode active material, on a surface of which a lithium compound is present, thus removing the lithium compound present on the surface of the cathode active material, and a mixing step of mixing the cathode active material, which is mixed with the lithium compound removal solution, with a conductive material and a binder.

In the preparation step, removal step, and mixing step, the lithium compound may be lithium hydroxide (LiOH).

The method may further include, between the removal step and the mixing step, a reaction maintenance step of maintaining a reaction for 20 minutes or more so that LiOH present in the cathode active material is reacted with polyacrylic acid (PAA) to generate Li-PAA.

The method may further include a drying step of drying a solvent between the reaction maintenance step and the mixing step in order to remove $H_2O$ generated in the reaction of LiOH with PAA in the removal step.

The solvent may include one or more of $CH_3OH$, $CH_3CH_2OH$, $CH_3CH(OH)CH_3$, $H_2O$, NMP, DMSO, DMF, hexane, and THF.

An average molecular weight of PAA used in the removal step may be 100,000 or more and 4,000,000 or less.

In the removal step, a content of LiOH present on the surface of the cathode active material mixed with the LiOH removal solution may be 0.05 to 1.5 wt % of a mass of the cathode active material.

In the preparation step, a content of PAA may be 20 to 300 wt % of a mass of LiOH in the cathode active material.

Meanwhile, a lithium secondary battery according to an embodiment of the present disclosure may include a cathode including a cathode active material manufactured using the method of mixing the cathode active material, an anode, a separation membrane interposed between the cathode and the anode, and an electrolytic solution.

According to the method of mixing the cathode active material of the present disclosure, it is possible to stably maintain the physical properties of a cathode electrode slurry and to maximally ensure the electrochemical performance of the cathode active material, without an additional process such as water washing and heat treatment or a process of removing moisture to remove the unreacted lithium compound remaining on the surface of the high-capacity cathode active material.

DETAILED DESCRIPTION

Hereinafter, a detailed description will be given of embodiments of the present disclosure with reference to the appended drawings. However, the present disclosure is not limited to the following embodiments, and may be changed to have a variety of different forms. These embodiments are provided to fully describe the present disclosure to those skilled in the art.

Figure 1:
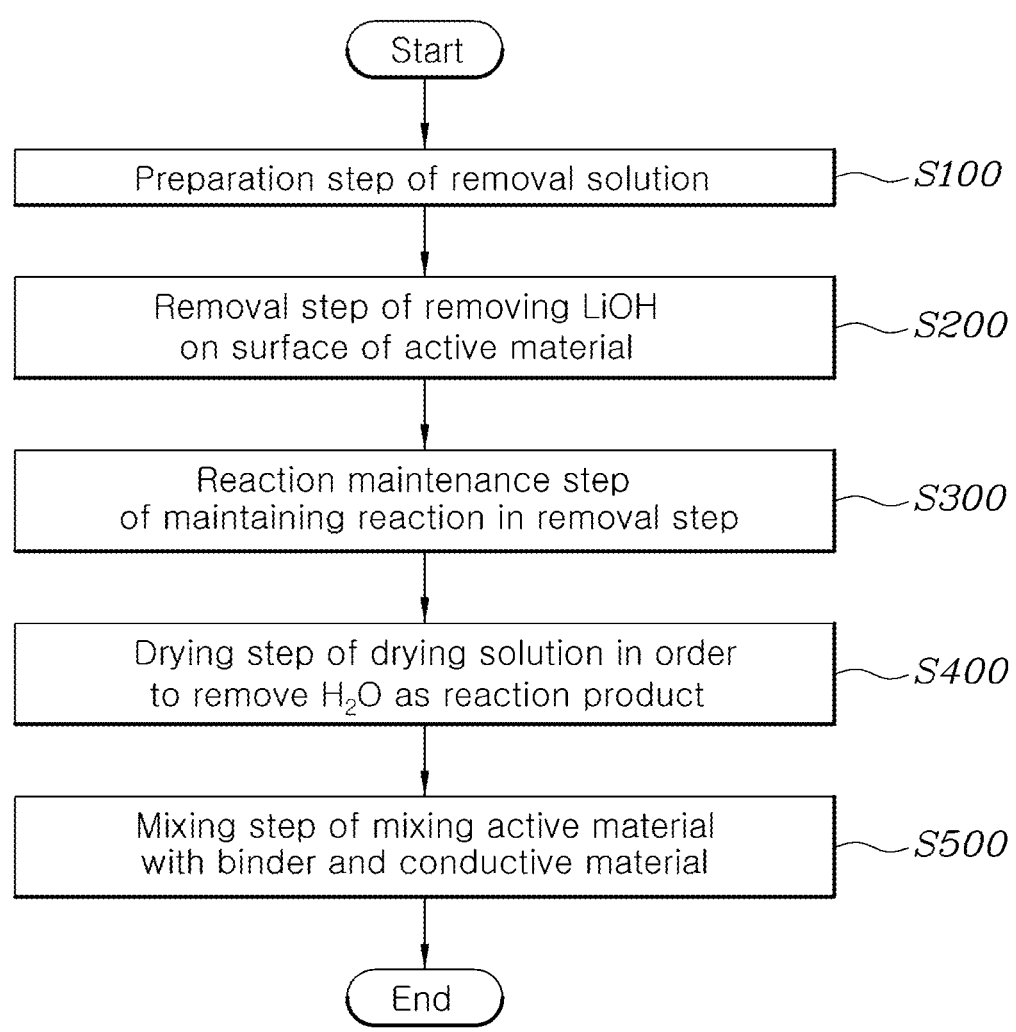
FIG. 1 is a flowchart showing a method of mixing a cathode active material according to an embodiment of the present disclosure.
Figure 2A:
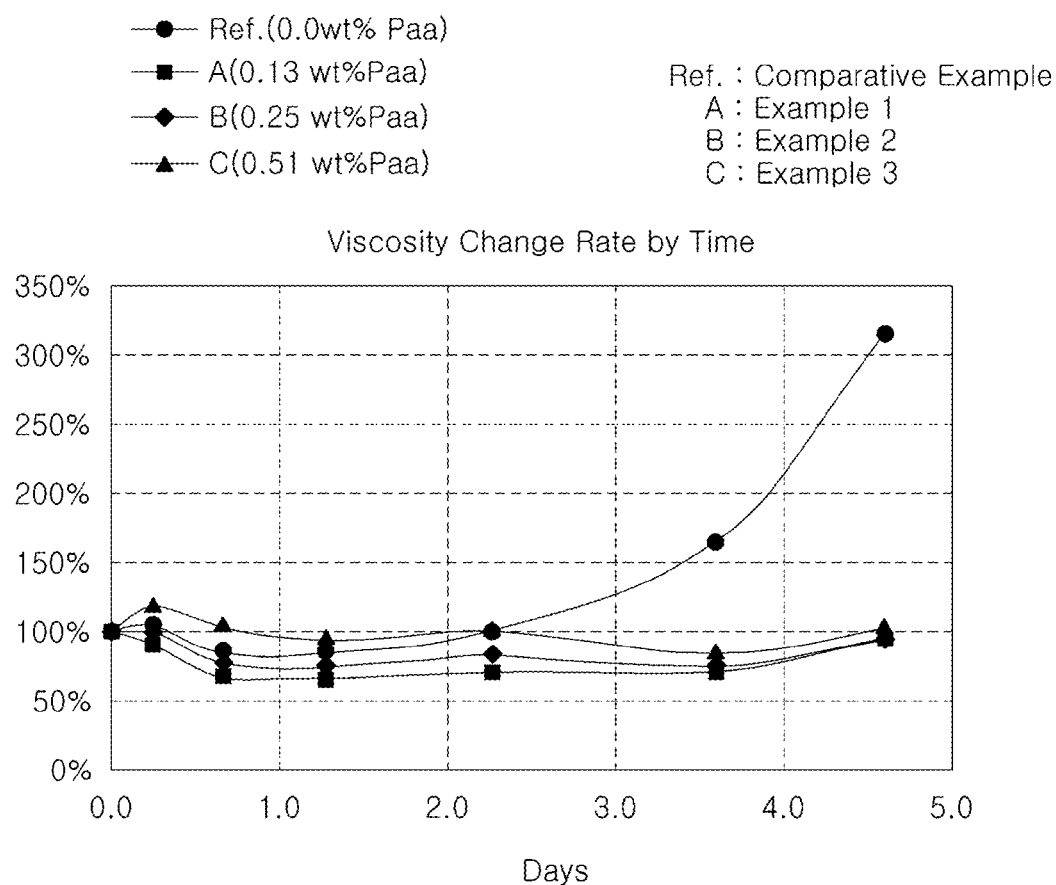
FIG. 2A is a graph showing changes in physical properties of the slurries according to Examples and a Comparative Example of the present disclosure.
Figure 2B:
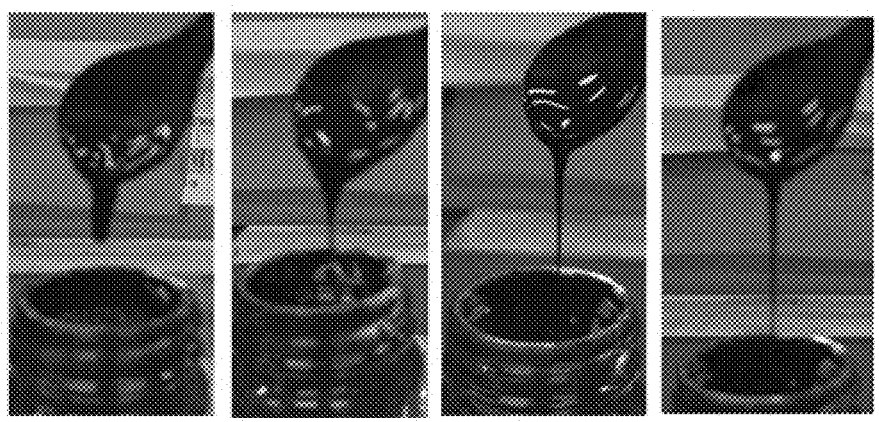
FIG. 2B is a photograph for comparing the fluidities of the slurries according to the Examples and the Comparative Example of the present disclosure after the slurries are left for 10 days.
Figure 3:
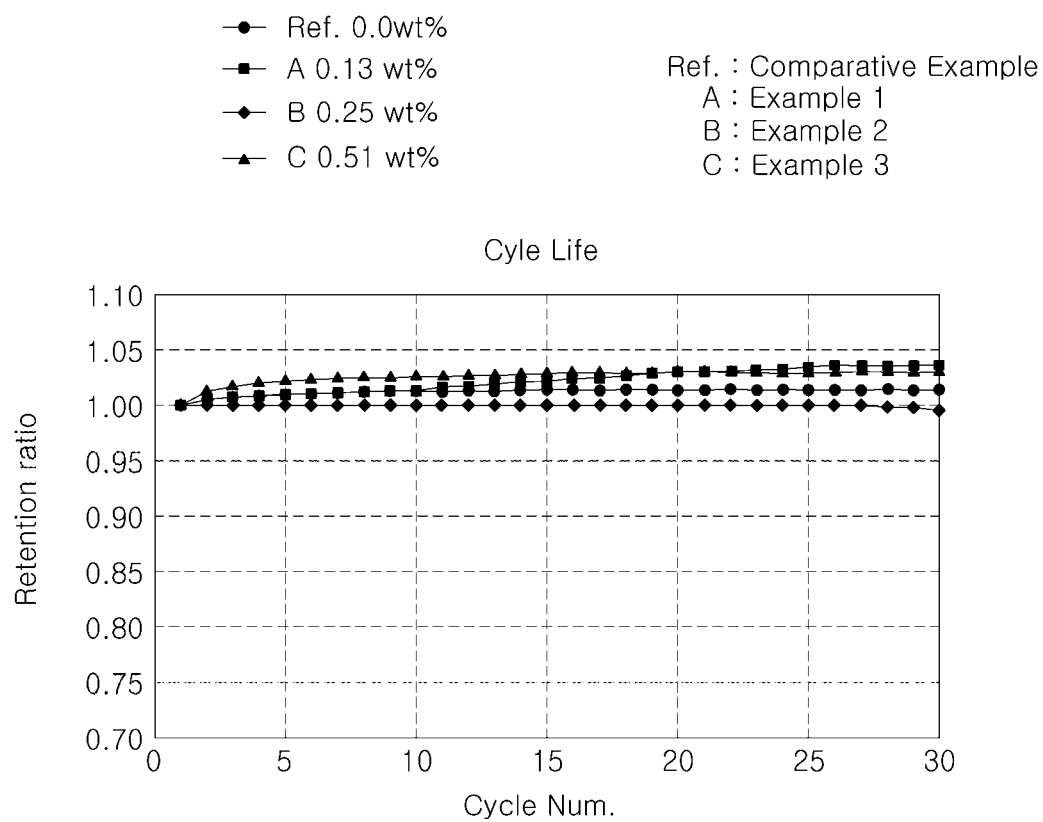
FIG. 3 is a graph showing the cycle characteristics of batteries to which the cathode active materials according to the Examples and the Comparative Example of the present disclosure are applied.

FIG. 1 is a flowchart showing a method of mixing a cathode active material according to an embodiment of the present disclosure. FIG. 2A is a graph showing changes in physical properties of the slurries according to Examples and a Comparative Example of the present disclosure. FIG. 2B is a photograph for comparing the fluidities of the slurries according to the Examples and the Comparative Example of the present disclosure after the slurries are left for 10 days. FIG. 3 is a graph showing the cycle characteristics of batteries to which the cathode active materials according to the Examples and the Comparative Example of the present disclosure are applied.

A process of a lithium secondary battery may be broadly divided into an electrode process, an assembly process, and a formation process. The electrode process may be divided into mixing, coating, pressing, slitting, and drying processes. The mixing process is a process of mixing an active material, a binder, and a conductive material to thus manufacture a slurry. Specifically, the binder is dissolved in a solvent to manufacture a solution, and an active material and a conductive material are mixed with the solution to manufacture the slurry. After the manufacture of the slurry, the slurry is stored and transferred. The manufactured slurry is stored in a slurry storage tank until coating is performed.

In the mixing process, Pvdf (polyvinylidene fluoride) is mainly used as the binder, and NMP (N-methyl pyrrolidone) is mainly used as the solvent.

The structure of Pvdf is as follows.

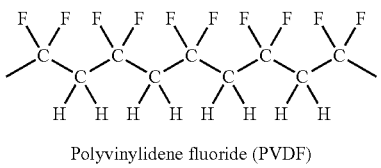 [SMILES: CC(F)(F)CC(F)(F)CC(F)(F)CC(F)(F)CC(C)(F)F]

Polyvinylidene fluoride (PVDF)

When an alkali component such as LiOH on the surface of the cathode active material approaches Pvdf, hydrogen is bonded to fluorine and thus desorbed in the form of hydrofluoric acid (HF). The binders that have lost F are bonded to each other while sharing C to form crosslinks, resulting in gelation of the slurry. Therefore, when the manufactured slurry is stored in the slurry storage tank over a long period of time, the slurry becomes gelled, and the performance of the cathode active material is not properly ensured.

Further, when remaining lithium is reacted with $CO_2$ in the atmosphere, lithium carbonate is generated. Lithium carbonate is decomposed at high temperatures to generate gas in the battery, which degrades the high-temperature characteristic.

In particular, in accordance with the demand for higher energy formation and lower cost of battery cells, it is required to increase the Ni ratio among the components of the cathode active material. As the Ni ratio is increased, the amount of Li remaining on the surface of the active material is increased, so there is a demand for a method to remove the unreacted lithium compound remaining on the surface of the cathode active material.

In order to accomplish the above objective, referring to FIG. 1, a method of mixing a cathode active material in a process of manufacturing a cathode of a lithium secondary battery according to the present disclosure includes a preparation step of preparing a lithium compound removal solution in which PAA is mixed with a solvent at step S100, a removal step of reacting the lithium compound removal solution with the cathode active material, on a surface of which a lithium compound is present, thus removing the lithium compound present on the surface of the cathode active material at step S200, and a mixing step of mixing the cathode active material, which is mixed with the lithium compound removal solution, with a conductive material, a binder, and the solvent at step S500.

Conventionally, a method of mixing a cathode active material with a binder solution and a conductive material is used. However, in this case, in order to remove the remaining lithium, water washing and heat treatment processes are further performed during the manufacture of the active material, or a method of controlling moisture is further performed during the added mixing process. Accordingly, there is a problem in that the production cost of active materials and the electrode manufacturing process cost are increased.

According to the present disclosure, PAA is mixed with the solvent to manufacture a removal solution for removing the lithium remaining on the surface of the cathode active material. The removal solution is mixed with the cathode active material to remove the lithium remaining on the surface thereof, so that the physical properties of the slurry are stably maintained even when the slurry is stored over a long period of time and the electrochemical properties are maximally ensured.

In the preparation step, removal step, and mixing step, the lithium compound may be LiOH.

LiOH is used to manufacture a battery having a high energy density and capacity, and is mainly synthesized with a high-nickel-cathode material whose nickel content is increased. Therefore, LiOH occupies a large proportion of the lithium compound remaining on the surface of the cathode material.

The method may further include, between the removal step and the mixing step, a reaction maintenance step, S300, of maintaining a reaction for 20 minutes or more so that LiOH present in the cathode active material is reacted with PAA to generate Li-PAA.

Specifically, the slurries of Examples are manufactured through the following process.

Manufacture of Slurry (Room Temperature and Relative Humidity of 20%)
 1) PAA (a molecular weight of 450,000) is dissolved in N-Methyl-2-Pyrrolidone (NMP) to manufacture a solution.
 2) The solution is added to the prepared active material, agitated well so that LiOH on the surface of the cathode active material is reacted with PAA in the solution, and then left. The reaction is maintained for 20 minutes or more.
3) Drying is performed in an oven at 120° C. in order to vaporize H₂O generated as a by-product during the reaction.
4) A conductive material and a binder solution are added and agitated well, followed by further agitation using an oil agitator.
5) The subsequent process is the same as a general mixing process, and the final composition of the slurry includes 90 wt % of the active material, 6.2 wt % of the binder (Pvdf+PAA), and 3.8 wt % of the conductive material.

The compositions of Examples and a Comparative Example are as follows.

TABLE 1

|  | Comparative Example 1 | Example 1 | Example 2 | Example 3 |
|---|---|---|---|---|
| PAA weight/LiOH weight | 0 | 0.25 | 0.5 | 1 |
| Weight of LiOH in active material after reaction | 0.28 wt % | 0.21 wt % | 0.19 wt % | 0.11 wt % |
| Weight of PAA relative to active material | 0.0 wt % | 0.13 wt % | 0.25 wt % | 0.51 wt % |

A sufficient reaction time is required in order to remove LiOH remaining in the cathode active material. The sufficient reaction time is 20 minutes or more regardless of the composition. From the result of measuring the viscosity over time after leaving the slurries manufactured according to the above-described Examples at relative humidity of 40% and room temperature, it was confirmed that the fluidity was maintained in the Examples while gelation was gradually performed over time and thus the fluidity became very low in the Comparative Example.

Referring to FIG. 2A, it can be confirmed from the graph that the viscosity is gradually increased over time in the Comparative Example, and that the viscosity is decreased and then recovered back to the original viscosity over time in the Examples.

Referring to FIG. 2B, it can be confirmed that among the slurries left for 10 days, the fluidities of the slurries are maintained in the Examples but the fluidity of the slurry is significantly reduced in the Comparative Example.

This shows that intermolecular crosslinks were formed between carbons in Pvdf over time in the Comparative Example, resulting in gelation of the slurry.

The method may further include a drying step, S400, of drying a solvent between the reaction maintenance step and the mixing step in order to remove H₂O generated in the reaction of LiOH with PAA in the removal step.

Specifically, PAA and LiOH are reacted with each other to generate water as a by-product, and the amount of water generated is increased as the amount of PAA added is increased relative to the weight of the active material, so sufficient drying is required.

The solvent mixed with the PAA may include one or more of CH₂OH, CH₃CH₂OH, CH₃CH(OH)CH₃, H₂O, NMP, DMSO, DMF, hexane, and THF.

The average molecular weight of PAA used in the removal step may be 100,000 or more and 4,000,000 or less.

Specifically, PAA is a polymer represented by the following Formula.

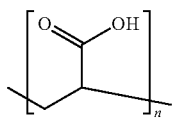

As n is increased, the average molecular weight is increased. As the average molecular weight is increased, the dissolution rate in the solvent is reduced. Therefore, it is preferable that the average molecular weight of PAA be 100,000 or more and 4,000,000 or less.

In the removal step, the content of LiOH present on the surface of the cathode active material mixed with the LiOH removal solution may be 0.05 to 1.5 wt % of the mass of the cathode active material.

In the preparation step, the content of PAA may be 20 to 300 wt % of the mass of LiOH in the cathode active material.

The chemical formula weight of LiOH is 24, and the molecular weight of the PAA unit is 72, which is three times as large as the chemical formula weight of LiOH. Accordingly, PAA is capable of being totally reacted with LiOH when PAA is added in an amount that is three times as large as the weight of LiOH present on the surface of the active material. However, it is possible to prevent a change in physical properties of the slurry even when PAA is added in an amount that is only 20% of the mass of LiOH.

Meanwhile, a lithium secondary battery according to an embodiment of the present disclosure may include a cathode including a cathode active material manufactured using the method of mixing the cathode active material, an anode, a separation membrane interposed between the cathode and the anode, and an electrolytic solution.

Specifically, in order to compare the electrochemical properties of the cathodes including the cathode active materials manufactured using the mixing method in the above-described Examples, a battery was manufactured through the following process.

Manufacture of Half-Cell for Electrochemical Evaluation
1) An electrode having an area density of 13.0 mg/cm² was coated with each slurry sample using a table coater.
2) The coated electrode was dried in an oven at 120° C.
3) After the drying, the electrode was rolled so as to have a compound density of 3.00 g/cc using a roll press.
4) After the rolled electrode was dried in a vacuum in a vacuum oven at 120° C. for 5 hours, a coin half-cell was manufactured. Lithium metal was used in the counter electrode of the cathode of the coin half-cell. An electrolytic solution included EC, EMC, and DEC at a ratio of 30:50:20 and had a composition of 1.2M LiPF₆ and 2% VC. After the assembly of the coin cell, the resultant structure was left for 6 hours, followed by charging, in order to perform impregnation in the electrolytic solution.

The discharge capacity and Coulomb efficiency were evaluated using the half-cell as described above, and are shown in the following Table.

TABLE 2

|  | Charging capacity (mAh/g) | Discharging capacity (mAh/g) | Coulomb efficiency (%) |
|---|---|---|---|
| Comparative Example | 211.7 | 180.5 | 85.3 |
|  | 222.4 | 196.7 | 88.4 |
| Example 1 | 231.4 | 210.6 | 91.0 |
|  | 227.8 | 206.8 | 90.8 |
| Example 2 | 226.6 | 206.6 | 91.1 |

TABLE 2-continued

|  | Charging capacity (mAh/g) | Discharging capacity (mAh/g) | Coulomb efficiency (%) |
|---|---|---|---|
|  | 226.4 | 207.1 | 91.5 |
| Example 3 | 210.2 | 190.6 | 90.7 |
|  | 206.3 | 186.7 | 90.5 |

When PAA was added, it was observed that the Coulomb efficiency of a first cycle was at least 3% higher than that of the Comparative Example. It is believed that this is because the formation of HF was suppressed by minimizing LiOH in the slurry.

Rate capabilities were evaluated using the above-described half-cell, and are shown in the following Table.

TABLE 3

|  | 0.1 C discharging capacity (mAh/g) | 0.3 C discharging capacity (mAh/g) 0.3 C/0.1 C (%) | 0.5 C discharging capacity (mAh/g) 0.5 C/0.1 C (%) |
|---|---|---|---|
| Comparative Example | 205.8 | 196.9<br>95.7 | 194.0<br>94.3 |
| Example 1 | 211.1 | 200.2<br>94.8 | 195.2<br>92.4 |
| Example 2 | 211.0 | 199.3<br>94.3 | 194.1<br>92.0 |
| Example 3 | 201.1 | 192.7<br>95.9 | 192.1<br>95.5 |

Test conditions for checking rate capabilities are as follows.

1) Charging was performed up to 4.3 with a constant current of 0.1 based on the specific capacity of the active material, and then with a constant voltage so that the end current was 0.05 C.

2) After a rest for 10 minutes, discharging was performed at 0.1 C.

3) After a rest for 10 minutes, the procedures of 1) and 2) were repeated at a current of 0.3 C and 0.5 C.

In terms of the discharging capacity, Example 2 and Example 3 showed the result equal to or better than that of the Comparative Example. In terms of the capacity expression rate, the case of Example 3 showed the result equal to or better than that of the Comparative Example.

A graph evaluating the cycle characteristics using the half-cell as described above is shown in FIG. 3.

Test conditions for evaluating the cycle characteristics are as follows.

1) Charging was performed up to 4.3 V with a constant current of 0.5 C based on the specific capacity of the active material, and then with a constant voltage so that the end current was 0.05 C.

2) After a rest for 10 minutes, discharging was performed at 0.5 C.

3) After a rest for 10 minutes, the procedures of 1) and 2) were repeated.

Referring to FIG. 3, it can be seen that the Examples and the Comparative Example show the similar cycle characteristics.

In summary, when PAA is mixed with the cathode active material in the process of mixing the cathode active material, the unreacted lithium compound remaining in the cathode active material may be reacted with PAA to be removed, thereby preventing the generation HF in Pvdf and the formation of crosslinks between the Pvdf molecules. Accordingly, gelation of the slurry may be prevented, so that the slurry is capable of being stored over a long period of time in the transferring/storage processes of the slurry after the mixing process and the cathode active material is capable of being protected from HF, thereby increasing the electrochemical properties.

Although matters related to specific embodiments of the present disclosure have been shown and described, it will be apparent to those of ordinary skill in the art that the present disclosure can be variously improved and changed within the limits not departing from the technical spirit of the present disclosure provided by the following claims.

What is claimed is:

1. A method of mixing a cathode active material in a process of manufacturing a cathode of a lithium secondary battery, comprising:
    a preparation step of preparing a lithium compound removal solution in which PAA (polyacrylic acid) is mixed with a solvent, wherein in the preparation step, the lithium compound is LiOH;
    a removal step of reacting the lithium compound removal solution with the cathode active material, on a surface of which the lithium compound is present, thus removing the lithium compound present on the surface of the cathode active material;
    a mixing step of mixing the cathode active material, which is mixed with the lithium compound removal solution, with a conductive material and a binder; and
    between the removal step and the mixing step, a reaction maintenance step of maintaining a reaction for 20 minutes or more so that the LiOH present in the cathode active material is reacted with the PAA to generate Li-PAA.

2. The method of claim 1, further comprising: a drying step of drying the solvent between the reaction maintenance step and the mixing step in order to remove $H_2O$ generated in the reaction of LiOH with the PAA in the removal step.

3. The method of claim 1, wherein the solvent includes one or more of $CH_3OH$, $CH_3CH_2OH$, $CH_3CH(OH)CH_3$, $H_2O$, NMP, DMSO, DMF, hexane, or THF.

4. The method of claim 1, wherein an average molecular weight of the PAA used in the removal step is 100,000 to 4,000,000.

5. The method of claim 1, wherein in the removal step, a content of the LiOH present on the surface of the cathode active material mixed with the lithium compound removal solution is 0.05 to 1.5 wt % of a mass of the cathode active material.

6. The method of claim 1, wherein in the preparation step, a content of the PAA is 20 to 300 wt % of a mass of the LiOH in the cathode active material.

7. A lithium secondary battery comprising:
    a cathode including a cathode active material manufactured using the method of mixing the cathode active material according to claim 1;
    an anode;
    a separation membrane interposed between the cathode and the anode; and
    an electrolytic solution.

* * * * *